United States Patent [19]
Voskamp

[11] Patent Number: 5,310,282
[45] Date of Patent: May 10, 1994

[54] HYDROCARBON RECOVERY FROM DRILLING MUD STORED IN SALT CAVITY

[76] Inventor: Thomas A. Voskamp, 3807 St. Andrews Ct., Midland, Tex. 79707

[21] Appl. No.: 18,126
[22] Filed: Feb. 16, 1993
[51] Int. Cl.⁵ .............................................. B65G 5/00
[52] U.S. Cl. .................................... 405/58; 405/59; 405/128
[58] Field of Search ............... 405/53, 55, 57, 58, 405/59, 128

[56] References Cited

U.S. PATENT DOCUMENTS

| | | | |
|---|---|---|---|
| 3,724,898 | 4/1973 | Jacoby | 299/61.5 |
| 4,456,400 | 6/1984 | Heide | 405/128 |
| 4,576,513 | 3/1986 | Lindorfer | 405/128 |
| 4,577,999 | 3/1986 | Lindorfer | 405/53 |
| 4,692,061 | 9/1987 | Lindorfer | 405/128 |
| 4,906,135 | 3/1990 | Brassow | 405/128 |
| 4,919,822 | 4/1990 | Boulanger | 201/747 |
| 4,976,569 | 12/1990 | Brachler | 405/59 |
| 5,004,298 | 4/1991 | Boulanger | 299/5 |

Primary Examiner—David H. Corbin
Attorney, Agent, or Firm—Marcus L. Bates

[57] ABSTRACT

Used drilling mud, and other high solids oilfield waste which has been contaminated with hydrocarbons, is pumped downhole into a salt cavity where the mud and hydrocarbons separate with the mud gravitating to the bottom of the cavity and the hydrocarbons rising toward the surface of the ground. Brine separates the accumulated hydrocarbons from the residual mud. The brine or the hydrocarbons is selectively removed for sales while additional water or contaminated mud is added to the system as may be required. The salt cavity preferably is located in a geographical area wherein anhydride ledges are formed therewithin upon formation of the cavity. The resultant ledges form baffle plates that coalesces the separated particles of oil and enhance formation of the separated hydrocarbon.

19 Claims, 1 Drawing Sheet

HYDROCARBON RECOVERY FROM DRILLING MUD STORED IN SALT CAVITY

BACKGROUND OF THE INVENTION

The present invention discloses a method of safely disposing of used drilling mud and reclaiming hydrocarbons separated therefrom. The drilling of oil and gas wells involves the use of various different compositions of drilling fluid or mud. The drilling mud is heavier than water and is employed to increase the hydrostatic head in the wellbore and to provide a suitable medium for circulating the material removed by the drill bit to the surface of the earth.

Oil based mud is sometime used as the drilling fluid. While forming a borehole into the earth, various hydrocarbon bearing formations are penetrated by the drill bit and this also accounts for hydrocarbon becoming admixed with the drilling mud. Accordingly, the used drilling mud contains hydrocarbons, weight increasing compounds such as barite, the removed formation that forms the borehole, various salts, and many other objectionable compounds which must be properly disposed of so that they do not enter and contaminate our environment, especially flowing streams and the underlying aquifer.

There are many salt domes or salt formations located below the surface of the earth. These salt formations can be penetrated by a wellbore and water circulated into the salt formation, thereby leaching the salt and forming a cavity, also called a salt cavern or a salt jug. The water dissolves the salt and becomes salt water, also called 10 pound brine. The brine can be sold to drilling companies so that it can be admixed with drilling mud and used as a component of drilling fluid.

In certain geographical areas of the United States, such as West Texas, there is an underground geological formation referred to as the Rustler formation. In the Rustler formation, the salt formations were formed by nature in a more or less sandwiched relationship with respect to a number of smaller anhydride formations. When a borehole is sunk into a salt formation contained in the Rustler formation, the salt can be solubilized with water to form a solution cavity, leaving vertically spaced layers of anhydride formations remaining within the cavity due to the anhydride being insoluble in brine. The anhydride formations are relatively flat, thin, horizontally extending formations spaced apart from one another and are often formed throughout the salt formation. Accordingly, a large salt cavity having a capacity of millions of barrels can be formed within a salt formation, with the cavity being intersected by a plurality of anhydride ledges that have been arranged by nature in a more or less vertically spaced, horizontal planes. The insoluble anhydride ledges therefore interrupt the solution cavity and form a baffle-like structure therewithin which provide unexpected and desirable results respective to the present invention.

SUMMARY OF THE INVENTION

A method of disposing of material that has been contaminated with hydrocarbons, wherein the material is heavier than ten pound brine, by translocating the contaminated material into a previously formed cavity located in a downhole salt formation. Water is circulated downhole to solubilize part of the salt formation to form the cavity within the downhole salt formation. The water soon becomes saturated with salt and the resultant brine is accumulated in the cavity so that it can be produced as needed.

The brine is displaced from the cavity by injecting quantities of the contaminated material thereinto whereupon the relatively dense component of the contaminated material gravitates to the bottom of the cavity while the relatively light hydrocarbons separate therefrom and rise up through the brine toward the surface of the ground to accumulate in the top of the cavity.

This forms a layer of the residual contaminated material on the bottom of the cavity, a layer of hydrocarbons at the top of the cavity, and a solution of brine therebetween. Accordingly, the contaminated material can flow downhole where it is deposited in the bottom of the cavity where phase separation occurs, with the hydrocarbons separated therefrom rising up through the brine to the top of the cavity.

Hence each barrel of contaminated material transferred into the cavity displaces an equal volume of liquid from the cavity. Accordingly, either brine or hydrocarbons can be selectively removed from the cavity and stored for sales. Further, from time to time, additional water can be pumped downhole to replenish any brine that has been removed therefrom.

It is possible to select a cavity having anhydride ledges formed therein in vertical spaced relationship respective to one another. The ledges form horizontally extending baffle members causing the rising hydrocarbons to assume a tortuous flow path during their ascent toward the top of the cavity. This coalesces the small separated oil particles into large droplets and thereby enhances formation of the hydrocarbon component of the cavity. Hence the coalescing of the separated oil into large droplets, and the washing of the droplets as they ascend through the brine solution, provide reclaimed crude hydrocarbons that can be marketed.

A primary object of the present invention is the provision of a method of disposing of material that is heavier than brine and contaminated with hydrocarbons by flowing the contaminated material downhole into a salt cavity containing brine, whereupon the hydrocarbons separate from the material and rise toward the surface while the heavier, residual material gravitates toward and is deposited on the bottom of the cavity.

Another object of the invention is to provide a method of disposing of a material that is heavier than water and contaminated with hydrocarbons by flowing the contaminated material downhole into a salt cavity filled with brine, whereupon the hydrocarbons separate and rise up through the brine to the surface while the separated, heavier, residual material is deposited on the bottom of the cavity.

A further object of this invention is to provide a method of separating hydrocarbons from used drilling mud, reclaiming the hydrocarbons from the drilling mud, and storing the separated drilling mud safely downhole in a salt cavity by pumping the contaminated material downhole into a salt cavity filled with brine, whereupon the hydrocarbons separate and rise up through the brine toward the surface of the earth while the separated, heavier, residual material is deposited on the bottom of the cavity.

A still further object of this invention is the provision of a method of separating hydrocarbons from used drilling mud by forming a solution cavity downhole in a salt formation having spaced apart anhydride formations vertically spaced from one another therein which form baffle members for coalescing oil droplets and thereby enhancing the recovery of the hydrocarbons from the separated drilling mud, flowing drilling mud that is contaminated with hydrocarbons to the bottom of the cavity, whereupon the hydrocarbons separate from the mud, ascend up through the brine contained in the solution cavity, and accumulate at the top of the cavity.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

DETAILED DESCRIPTION OF THE PREFERRED EMBODIMENT

Figure 1:
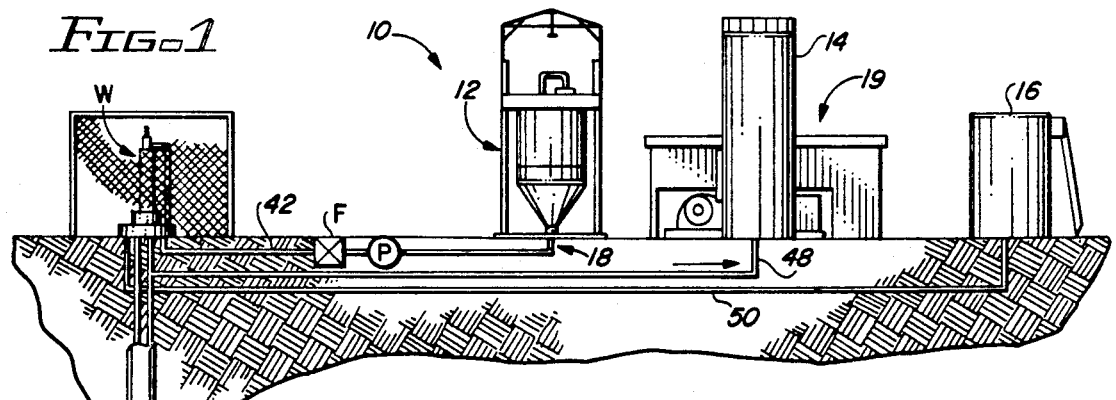
FIG. 1 is a part schematical, part diagrammatical, side view of apparatus made in accordance with the present invention by which the present method can be carried out; and, FIG. 2 is a diagrammatical representation of a cross-section of the earth showing the method of the present invention.

In the Figures of the drawing there is disclosed a flow system 10 for carrying out the present invention. As best seen illustrated in FIG. 1, mud storage tanks 12 are supported above the ground adjacent to a brine storage silo 14 and a hydrocarbon storage vessel 16. A source of water 18 is connected into the flow system to provide a supply of water to be pumped into the illustrated wellhead W. Suitable piping also interconnects the mud storage tank 12, brine storage silo 14, and hydrocarbon storage vessel 16 in such a manner that the mud contained at tank 12 can be pumped by mud pump P through filter device F and down through suitable piping disclosed as extending downhole in a wellbore that terminates at the upper end as the wellhead W. The piping also allows the flow lines to be flushed with water on accession.

The brine storage silo 14 is connected to the wellhead W by means of the illustrated piping 48 such that brine can flow uphole to the wellhead W and into the brine storage silo 14. The hydrocarbon storage vessel 16 is connected by piping 50 such that separated hydrocarbons can be transferred from the wellhead W into the tank 16.

Figure 2:
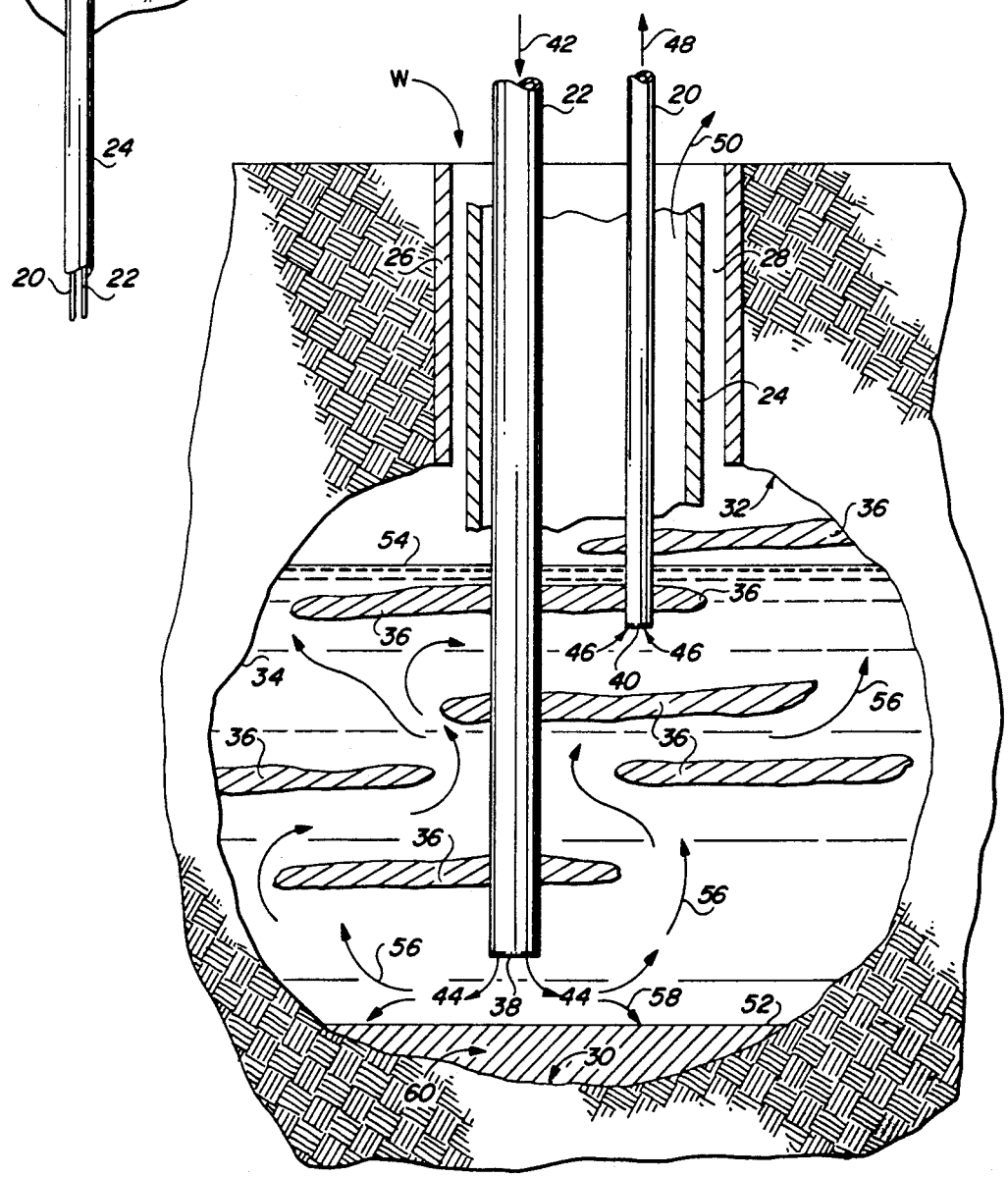

In FIG. 2, a brine production pipe 20, a mud flow line 22, and a production casing 24 are suitably connected to the before mentioned wellhead W such that suitable flow paths are formed between salt cavity 30 and the surface equipment. Surface casing 26 protects the aquifer while annulus 28 is formed therebetween.

The salt cavity 30 is defined by a bottom 30', a top 32 opposed to the bottom 30', and a circumferentially extending sidewall 34 between the bottom 30' and top 32. The lower end of the production casing 24 communicates with the top 32 of the salt cavity to provide access to the interior of the cavity. Anhydride ledges 36 lie in vertically spaced, horizontal planes. The anhydride ledges 36 therefore extend more or less horizontally and are vertically spaced from one another and extend into the salt cavity to form baffles.

Numeral 38 indicates the outlet or lower terminal end of the mud flow line 22. The outlet end 38 is placed in close proximity respective to the bottom 30' of the salt cavity. The brine flow line 20 has an inlet end 40 placed in the upper central part of the salt cavity in an effort to locate the inlet thereof centrally respective to the brine stored within the cavity 30, and thereby have access only to the 10 pound brine.

Accordingly, mud can flow from 12 along flow line 42 into the piping 22 where the mud emerges at outlet 38 at a location within the cavity that is above the bottom 30' of the salt cavity so that mud enters at location 44. The mud commences to separate into hydrocarbons and residual mud as it gravitates toward the bottom where it is deposited. Some liquid will also separate from the mud and become part of the brine solution.

Brine, which is stored in the central portion 34 of the salt cavity, surrounds the brine production tubing as noted by numeral 46 and can therefore be forced up the brine production tubing 20 to the wellhead W where it continues along flow line 48 to the before mentioned brine storage silo 14.

Numeral 50 indicates the upward flow of material through the production casing 24 and to the wellhead W, where it can then flow through the flow line 50 to the before mentioned hydrocarbon storage tank 16.

In FIG. 2, numeral 52 indicates the interface that is formed between the mud 60 and the brine at 34, while numeral 54 indicates the interface that is formed between the brine at 34 and the separated oil located within the upper part 32 of the salt cavity.

As the contaminated mud is deposited in the lower part of the cavity at 44, it commences to separate, whereupon the separated small particles of lighter hydrocarbons 56 commence rising toward the top 32 of the salt cavity while the separated or residual heavier mud components commence to descend at 58 toward the bottom 30' of the salt cavity, and the residual mud accumulates as indicated by numeral 60.

Accordingly, those skilled in the art, having digested this disclosure, will appreciate that mud trucks arrive on location 10 and the used or contaminated mud is transferred into the mud storage tanks 12 and subsequently pumped along surface flow line 42 into the mud flow pipe 22 connected at wellhead W. The mud enters the salt cavity at outlet 38 where it commences separating as indicated by numeral 44. The lighter ends, comprised essentially of hydrocarbons, rise toward the surface at 56 as the hydrocarbons separate from the contaminated mixture of mud. The heavy ends comprised of various constitutes of the mud, depending upon its formulation, gravitates downward as indicated by numeral 38 to form a layer of semi-solid residual mud 60 on the bottom 30' of the salt cavity 30.

Each barrel of material entering the salt cavity 30 displaces reclaimed hydrocarbons at 50, or alternatively, displaces brine at 46. The material can be used mud, sludge, tank bottoms, water, or other heavy material that has been contaminated with hydrocarbons. Further, it is sometime desirable to add to the volume of the brine contained within the salt cavity in which instance water is pumped from 18, along flow line 42, down the mud flow pipe 22, into the salt cavity at 38. Alternatively, the water can be added at flow line 48 whereupon the water flows down the brine production tubing 20 and emerges at the lower end 40 thereof where the water admixes with the brine and eventually solubilizes some of the salt formation and eventually becomes ten pound brine water.

The separated hydrocarbons rise up through the brine toward the surface along a circuitous or tortuous path 56 as it encounters the baffles 36 formed by the anhydride layers. This coalesces the small particles of hydrocarbon into droplets of oil which accumulate at interface 54 and can be produced up through the production casing 24, where the oil flows along surface line 50 into the oil storage vessel 16.

In actual practice, the separation and accumulation of the hydrocarbons from the mud may require several years for significant reclamation of economical quantities of the hydrocarbon. However, introduction of used mud into the system 10 can displace an equal quantity of 10 pound brine for sales until sufficient quantity of separated hydrocarbon has acumulated to justify sales.

Accordingly, the present invention provides a method of treating used drilling mud, or other high solids oilfield waste, and the like, to separate and reclaim hydrocarbons therefrom while safely storing the residual separated mud downhole in a solution cavity. This is achieved by flowing water into a salt formation to provide a saturated solution of brine within the resultant cavity. The used drilling mud is flowed into the bottom of the cavity whereupon the drilling mud separates into hydrocarbons and residual mud with the residual mud gravitating to the bottom of the cavity while the hydrocarbons gravitate to the top of the cavity to form a three phase system wherein there is a separated hydrocarbon layer at the top of the cavity, a separated residual mud layer at the bottom of the cavity, and a solution of brine therebetween. Either the brine or the hydrocarbons is selectively displaced from the cavity by pumping either of the contaminated mud or water into the cavity. The preferred embodiment of this invention includes that a cavity be formed in a geological formation having a plurality of baffle members in the form of anhydride ledges whereby ledges form a tortuous flow path respective to the upward flow of hydrocarbons that have separated from the contaminated mud whereby the hydrocarbons rising toward the top of the salt cavity are coalesed by encountering the anhydride ledges as the hydrocarbons flow up toward the top of the salt cavity. This provides a method of disposing of used drilling mud and thereafter reclaiming hydrocarbons therefrom. Other material such as oil bearing sludge and waste material containing hydrocarbons can also be separated into hydrocarbons and semi-solid matter where the residual material is heavier than brine.

I claim:

1. Method of disposing of material heavier than brine that has been contaminated with material lighter than brine, comprising the steps of:

A. forming a cavity having a lower, central, and upper part in a downhole salt formation by communicating the salt formation with the surface of the earth, and circulating water downhole into said salt formation and uphole to the surface of the earth to solubilize the salt, form the cavity, and fill the cavity with brine;

B. forming a flow path for contaminated material to flow into the bottom of said cavity by extending an inlet feed pipe from the surface of the earth down into said cavity;

C. displacing brine from said cavity by injecting quantities of the contaminated material into said cavity whereupon the relatively dense component of said contaminated material gravitates to the bottom of said cavity while the relatively light component of the contaminated material separate from the material and rises toward the surface of the ground, leaving the dense component of the material on the bottom of the cavity;

D. flowing water from the surface of the earth, into the middle part of said cavity while displacing brine from said cavity by communicating a production pipe with the middle part of the cavity and the surface of the earth, and flowing the displaced brine uphole to the surface of the earth;

E. forming a tortious flow path within said cavity along which the separated material lighter than brine flows as the lighter material rises toward the surface of the ground by selecting said salt formation in a geological strata having a plurality of spaced anhydride formations located within the cavity area, and using said anhydride ledges to form a plurality of baffle members that force the ascending lighter material separated from the contaminated material to assume said tortuous flow path and thereby coalesce the separated lighter material and enhance the accumulation thereof at the top of the cavity;

F. whereby material heavier than brine that has been contaminated with lighter material can be deposited within the lower part of the cavity, while lighter material separates from the heavier material and flows uphole toward the top of the cavity, and brine can be produced from the cavity by flowing the brine to the surface of the ground.

2. The method of claim 1 and further including the steps of:

using drilling mud as the contaminated material and conveying the mud along said flow path that extends into the cavity and discharging the mud at a location within the brine and below the lighter material; and, conveying the brine along a flow path that extends from a location that is below the lighter material and extends to the surface of the ground.

3. Method of disposing of material heavier than brine that has been contaminated with hydrocarbons, comprising the steps of:

selecting a salt formation that is located below the surface of the ground;

forming a flow path for water to flow into the salt formation by extending a water flow pipe from the surface of the ground down to the salt formation;

circulating water downhole into said salt formation to solubilize the salt and thereby form a cavity that is filled with brine; said cavity has an upper, middle and lower part;

forming a flow path along which the contaminated material flows from the surface, down to the lower part of the cavity by extending an inlet feed pipe from the surface of the ground down into the cavity;

displacing the brine from said cavity by injecting quantities of the contaminated material thereinto whereupon the relatively dense component of said contaminated material gravitates to the bottom of said cavity while the relatively light hydrocarbons separate from the contaminated material and rise toward the surface of the earth, leaving the residual material on the bottom of the cavity;

displacing the brine from said cavity by forming a flow path for water to flow from the surface, into the middle part of the cavity forcing the brine to flow uphole to the surface of the ground;

forming a tortious flow path within said cavity for the upwardly flowing hydrocarbons by interrupting the salt formation with a plurality of anhydride ledges that form spaced apart baffles within the cavity, and thereby coalescing the upwardly flowing hydrocarbons by contact with the ledges of anhydride as the separated hydrocarbons rise up through the brine and flow toward surface of the ground;

whereby, material heavier than brine that has been contaminated with hydrocarbons can be deposited in the lower part of the cavity, while hydrocarbons separate from the material and flow uphole toward the top of the cavity, and brine can be produced from the cavity by flowing the brine to the surface of the ground.

4. The method of claim 3 and further including the step of using drilling mud as the contaminated material, and displacing the brine in proportion to the quantity of contaminated material flowing into said cavity.

5. The method of claim 3 and further including the step of selectively removing the hydrocarbons from the top of the cavity and brine from the middle of the cavity in proportion to the quantity of material flowing into said cavity.

6. The method of claim 3 and further including the step of using drilling mud as the contaminated material, and removing the brine or the hydrocarbon in proportion to the quantity of drilling mud flowing into said cavity; and, removing the brine or the hydrocarbons from the cavity in proportion to the quantity of water flowing into said cavity.

7. In a subterranean salt cavity communicated with the surface of the ground by a cased borehole, a method of treating used drilling mud to separate and reclaim hydrocarbons therefrom while safely storing the residual separated mud downhole in said cavity, comprising the steps of:

flowing water into a subterranean salt cavity to provide a saturated solution of brine within said cavity;

flowing drilling mud into the bottom of said cavity;

separating said drilling mud into hydrocarbon and residual mud, with the residual mud gravitating to the bottom of the cavity and the hydrocarbons gravitating to the top of the cavity to form a three phase system wherein there is a separated hydrocarbon layer at top of the cavity, a separated residual mud layer at the bottom of the cavity, and a solution of brine therebetween;

displacing either of the brine and hydrocarbons from the cavity by pumping either of contaminated mud and water into the cavity;

selecting the cavity in a geological formation that includes a plurality of baffle members in the form of anhydride ledges; and, using the ledges to form a circuitous flow path for the flow of hydrocarbons separated from the contaminated mud.

8. The method of claim 7 and further including the steps of:

conveying the contaminated drilling mud along a flow path that transfers the contaminated drilling mud into the cavity at a location below the hydrocarbon layer; and, conveying the brine along a flow path that has an inlet located below the hydrocarbons and extends uphole to the surface of the ground.

9. The method of claim 8 and further including the steps of coalescing the hydrocarbons separated from contaminated mud by forcing the upward flow of hydrocarbons to assume a tortious flow path as the separated hydrocarbon contact the ledges of anhydride in the cavity and rise up through the cavity and to the surface of the ground.

10. The method of claim 8 and further including the steps of displacing the brine from the cavity in proportion to the quantity of material flowing into said cavity.

11. The method of claim 8 and further including the steps of removing the separated hydrocarbons or brine from the cavity in proportion to the quantity of contaminated mud or water flowing into said cavity.

12. Method of disposing of material heavier than brine and admixed with hydrocarbons by reclaiming the hydrocarbons therefrom while the residual material is stored underground, comprising the steps of:

selecting a downhole salt formation and forming a solution cavity therein by forming a flow path between the salt formation and the surface of the ground and solubilizing some of the salt formation by flowing water along said flow path into said solution cavity;

flowing material heavier than brine and admixed with hydrocarbon from the surface into the cavity, whereupon the hydrocarbon separates from the material and the residual material flows to the bottom of the cavity;

forming said cavity in a geological formation that includes a plurality of baffle members in the form of anhydride ledges, whereby the ledges form a tortious flow path respective to the upward flow of hydrocarbons separated from said residual material;

displacing a volume of brine from the solution cavity with a volume of said material by flowing said material into the solution cavity;

forming a layer of hydrocarbon within the upper part of the cavity by collecting the separated hydrocarbon that ascends the cavity, collecting a layer of residual material within the lower part of the cavity, and collecting a layer of brine therebetween;

producing brine by flowing the brine along a flow path that extends from the layer of brine to the surface of the ground, and producing hydrocarbon by flowing the hydrocarbon along a flow path that extends from the layer of hydrocarbon to the surface of the ground.

13. The method of claim 12 and further including the step of using contaminated drilling mud for said material and conveying said mud along a flow path that extends to a location below the brine;

conveying the brine along a flow path that extends from a location below the hydrocarbons to the surface of the ground; and, producing the hydrocarbons by flowing the hydrocarbon along a flow path to the surface of the ground.

14. The method of claim 13 and further including the step of coalescing hydrocarbons that separate from the contaminated mud by contacting the hydrocarbons with the ledges of anhydride during the upward flow of the hydrocarbons towards the top of the cavity.

15. The method of claim 13 and further including steps of removing the brine from the cavity in proportion to the quantity of contaminated mud flowing into said cavity.

16. The method of claim 13 and further including the steps of displacing brine and hydrocarbons from the cavity in proportion to the quantity of water and contaminated mud flowing into said cavity.

17. The method of claim 1 and further including the step of selectively removing hydrocarbons from the top of the cavity and brine from the middle of the cavity in proportion to the quantity of material flowing into said cavity.

18. The method of claim 1 and further including the step of forming a flow path that extends from the top of the cavity to the surface of the ground; and,
removing the hydrocarbons from the top of the cavity in proportion to the quantity of material flowing into said cavity by flowing hydrocarbons along the last recited flow path.

19. The method of claim 3 and further including the steps of producing hydrocarbons from the top of the cavity in proportion to the quantity of material flowing into said cavity by flowing the hydrocarbons along a flow path that extends from the upper end of the cavity to the surface of the ground.

* * * * *